United States Patent
Yates et al.

(10) Patent No.: US 11,001,518 B1
(45) Date of Patent: May 11, 2021

(54) METHODS FOR TREATMENT AND PURIFICATION OF OIL AND GAS PRODUCED WATER

(71) Applicant: Rio Resources LLC, New Braunfels, TX (US)

(72) Inventors: Dale R. Yates, Spring Branch, TX (US); Brenna D. Villines, Mansfield, TX (US); Kenneth M. Yates, Keller, TX (US)

(73) Assignee: Rio Resources LLC, New Braunfels, TX (US)

( * ) Notice: Subject to any disclaimer, the term of this patent is extended or adjusted under 35 U.S.C. 154(b) by 0 days.

(21) Appl. No.: 16/789,142

(22) Filed: Feb. 12, 2020

(51) Int. Cl.
  *C02F 9/00* (2006.01)
  *C02F 3/12* (2006.01)
  (Continued)

(52) U.S. Cl.
  CPC .............. *C02F 9/00* (2013.01); *C02F 1/02* (2013.01); *C02F 1/441* (2013.01); *C02F 1/442* (2013.01);
  (Continued)

(58) Field of Classification Search
  CPC .... C02F 9/00; C02F 1/441; C02F 1/66; C02F 2103/365; C02F 1/42; C02F 3/12; C02F 2101/20; C02F 2209/06; C02F 3/30; C02F 3/34; C02F 2103/06; C02F 3/02; B01D 2311/2649; B01D 17/085; B01D 17/0202;
  (Continued)

(56) References Cited

U.S. PATENT DOCUMENTS 3,510,006 A    5/1970   Cheysson
3,666,108 A    5/1972   in 't Veld
              (Continued)

FOREIGN PATENT DOCUMENTS

GB   2413124 A  * 10/2005  ............. B01D 39/06

OTHER PUBLICATIONS

Ahmadun, Fakhru'l-Razi, Pendashteh, Alireza, Abdullah, Luqman Chuah, Biak, Dayang Radiah Awang Madaeni, Sayed Siavash, & Abidin, Zurina Zainal (2009). Review of technologies for oil and gas produced water treatment. Journal of Hazardous Materials, 170, 530-551 (22 pages).

(Continued)

*Primary Examiner* — Claire A Norris
(74) *Attorney, Agent, or Firm* — Pizarro Allen PC

(57) ABSTRACT

A method of treating oil and gas produced water may include: receiving produced water from one or more wells; separating an aqueous portion of the produced water from oil and solids included in the produced water in order to provide recovered water; performing anaerobic bio-digestion of organic matter included in the produced water using a biomass mixture of anaerobic bacteria obtained from a plurality of wells; aerating the recovered water in order to promote metal precipitation; and performing aerobic bio-digestion of organic matter present in the recovered water. Some embodiments may also include one or more of anoxic equalization, filtration, pasteurization, reverse osmosis, and biocide treatment of the recovered water. The recovered water may be used for oil and gas well fracking and/or land and stream application. Other methods of treating oil and gas produced water are also described.

20 Claims, 3 Drawing Sheets

(51) Int. Cl.
| | |
|---|---|
| *C02F 3/28* | (2006.01) |
| *C02F 1/02* | (2006.01) |
| *C02F 1/52* | (2006.01) |
| *C02F 1/50* | (2006.01) |
| *C02F 1/44* | (2006.01) |
| *C02F 101/30* | (2006.01) |
| *C02F 101/20* | (2006.01) |
| *C02F 103/10* | (2006.01) |

(52) U.S. Cl.
CPC ............... *C02F 1/444* (2013.01); *C02F 1/50* (2013.01); *C02F 1/5236* (2013.01); *C02F 3/1268* (2013.01); *C02F 3/28* (2013.01); *C02F 2101/20* (2013.01); *C02F 2101/30* (2013.01); *C02F 2103/10* (2013.01); *C02F 2301/106* (2013.01); *C02F 2303/04* (2013.01)

(58) Field of Classification Search
CPC .. B01D 61/025; B01D 61/027; B01D 61/147; B01D 61/145; B01D 61/58; Y02W 10/15; E21B 41/005
USPC ....... 210/605, 630, 631, 724, 203, 620, 650, 210/652; 175/66
See application file for complete search history.

(56) References Cited

U.S. PATENT DOCUMENTS

| | | | |
|---|---|---|---|
| 3,849,310 | A | 11/1974 | Condolios et al. |
| 4,073,722 | A * | 2/1978 | Grutsch .................. C02F 3/121 210/624 |
| 4,482,459 | A | 11/1984 | Shiver |
| 4,783,272 | A | 11/1988 | Patterson |
| 5,132,025 | A | 7/1992 | Hays |
| 5,232,596 | A * | 8/1993 | Castaldi ..................... B09C 1/10 210/603 |
| 5,316,664 | A | 5/1994 | Gregoli |
| 5,908,040 | A | 6/1999 | Defraites, Jr. |
| 6,113,786 | A | 9/2000 | Burke |
| 7,527,736 | B2 | 5/2009 | Shafer et al. |
| 8,105,488 | B2 | 1/2012 | Shafer et al. |
| 8,529,763 | B2 | 9/2013 | Shafer et al. |
| 8,790,514 | B2 | 7/2014 | Shafer et al. |
| 8,877,690 | B2 | 11/2014 | Keister |
| 9,284,206 | B2 | 3/2016 | Presutti |
| 2003/0047499 | A1 | 3/2003 | Levitin |
| 2004/0031750 | A1 | 2/2004 | Larsson |
| 2005/0218074 | A1* | 10/2005 | Pollock ................ C02F 3/1273 210/637 |
| 2005/0274669 | A1 | 12/2005 | Marchesseault et al. |
| 2007/0102359 | A1 | 5/2007 | Lombardi et al. |
| 2008/0156709 | A1 | 7/2008 | Johnson |
| 2008/0237141 | A1 | 10/2008 | Kerfoot |
| 2009/0014392 | A1 | 1/2009 | McEwen |
| 2009/0032446 | A1 | 2/2009 | Wiemers et al. |
| 2009/0183922 | A1 | 7/2009 | Smith et al. |
| 2010/0038310 | A1* | 2/2010 | Shafer ....................... C02F 9/00 210/605 |
| 2010/0216217 | A1* | 8/2010 | Hendrickson ............. B09C 1/10 435/252.4 |
| 2011/0186510 | A1* | 8/2011 | Whiteman ................ C02F 3/12 210/630 |
| 2011/0272362 | A1 | 11/2011 | Sikes et al. |
| 2013/0048562 | A1 | 2/2013 | Keister |
| 2013/0126426 | A1* | 5/2013 | Jones ..................... C02F 3/341 210/615 |
| 2013/0203144 | A1 | 8/2013 | Josse |
| 2013/0341269 | A1 | 12/2013 | Bouchet |
| 2014/0021033 | A1 | 1/2014 | Frick |
| 2014/0116967 | A1 | 5/2014 | Smith et al. |
| 2014/0124453 | A1 | 5/2014 | Presutti |
| 2015/0001149 | A1* | 1/2015 | Kuehnle ................. C02F 3/341 210/601 |
| 2016/0045841 | A1* | 2/2016 | Kaplan ................... C01B 32/21 429/49 |
| 2019/0210891 | A1* | 7/2019 | Antonneau ............. C02F 3/006 |

OTHER PUBLICATIONS

Liu Ying, Wang, Jianyou, & Wang, Lidan (2019). An energy-saving "nanofiltration/electrodialysis with polarity reversal (NF/EDR)" integrated membrane process for seawater desalination. Part III. Desalination, 452, 230-237 (8 pages).

Monnot, Mathias, Laborie, Stéphanie, Cabassud, Corinne (2016). Granular activated carbon filtration plus ultrafiltration as a pretreatment to seawater desalination lines: Impact on water quality UF fouling. Desalination 383, 1-11 (11 pages).

Melo, Marcel, Schluter, Helga, Ferreira, Jailton, Magda, Rosana, Júnior, Agenor, & Aquino, Oswaldo de (2010). Advanced performance evaluation of a reverse osmosis treatment for oilfield produced water aiming reuse. Desalination, 250, 1016-1018 (3 pages).

Neff, Jerry M., Lee, Kenneth, & DeBlois, Elisabeth M. (2011). Produced Water: Overview of Composition, Fates and Effects (61 pages).

Pendashteh, Ali Reza, Abdullah, Luqman Chuah, Fakhru'l-Razi, A., Madaeni, Sayed Siavash, Abidin, Zurina Zainal, Biak, Dayang Radiah Awang (2012). Evaluation of membrane bioreactor for hypersaline oily wastewater treatment. Process Safety and Environmental Protection, 90, 45-55 (11 pages).

Turkiewicz, Anna, Brzeszcz, Joanna, Kapusta, Piotr (2013). The application of biocides in the oil and gas industry. NAFTA-GAZ Monthly Journal of the Oil and Gas Institute, Publication No. 69, 103-111 (9 pages).

United States Environmental Protection Agency. National Recommended Water Quality Criteria—Aquatic Life Criteria Table (8 pages).

Zhang, Min, Wang, Junming, Zhang, Zhongzhi, Song, Zhaozheng, Zhang, Zhenjia, Zhang, Beiyu, Zhang, Guangqing, Wu, Wei-Min (2016). A field pilot-scale study of biological treatment of heavy oil-produced water by biological filter with airlift aeration and hydrolytic acidification system. Environ Sci Pollut Res, 23, 4919-4930 (13 pages).

Osamor et al., "Oil/Water Separation: State-Of-The-Art", E.P.A., published 1978 (6 pages).

Kumar, et al., "A review of permissible limits of drinking water", Indian J. Occup. Environ. Med., Jan.-Apr. 2012, 16(1), pp. 40-44 (11 pages).

International Publication No. WO/1997/023264 dated Jul. 3, 1997 in International Patent Application No. PCT/US1995/016801 (20 pages).

* cited by examiner

METHODS FOR TREATMENT AND PURIFICATION OF OIL AND GAS PRODUCED WATER

FIELD

This application relates generally to the field of processing oilfield produced water transforming the produced water by methods of purification that yields a final product suitable for land or stream application.

BACKGROUND

There is an increasing problem with scarcity of available water around the world with only about 3% of total water being freshwater. The world's population is estimated at 7.5 billion with demand for freshwater sources growing rapidly. Water scarcity is recognized as one of the greatest problems and challenges of the 21st Century making water reuse a necessity. The oil and gas industry in managing oil and gas production both onshore and offshore have access to an untapped source of potential useable water, known as produced water, that is considered a hazardous waste product by industry and requiring costly disposal. Produced water includes formation water which may include seawater or freshwater that has been trapped in geological reservoirs with oil and natural gas. Globally, the produced water to oil ratio is about 3:1 with global estimates of approximately 250 million barrels/day. As wells mature, this ratio generally increases.

Chemical constituents and characteristics of produced water can vary significantly from location to location and region to region. Although primary constituents may vary in quantity, they remain a mixture of organic and inorganic compounds with insoluble formation solids. Minerals and heavy metals along with dissolved gasses and dispersed hydrocarbons are also present, along with the potential for naturally occurring radioactive materials (NORM), thus increasing the challenges for development of an effective treatment process.

Due to demands for freshwater and increasing production activity, there is a serious need for treatment methods that are flexible and cost effective to collect, treat, and recycle produced water for both stream and land application to meet irrigation needs and restoration of underground freshwater supplies. Multiple approaches have been employed to try and achieve repurposing of produced water; however, these approaches have proven to be deficient for a number of reasons, including an inability to handle large treatment volumes and high operational costs.

Methods currently employed to treat produced water have generally been limited for repurposing to meet a fracking water standard that is high in total dissolved solids consisting primarily of salt and commonly referred to as brackish or brine water. Melo et al. (Melo et al. 2010, Desalination, 250, 1016-1018) published a treatment method that evaluated incorporation of reverse osmosis and nano-filtration to produce a potentially beneficial product. The disclosed method included multiple pre-treatment steps and incorporated an oil/water separator, water softener, sand filters, ion exchange softener and cartridge filtration. One concern that the authors had with the process was that hazardous materials might still be present. No further reports on this treatment method have been identified.

Additional methods for purifying produced water have been employed such as evaporation/condensation and distillation, but large volume processing and time of processing remain serious issues for these types of approaches. Membrane anaerobic bioreactor approaches have had some laboratory success. For example, Pendashteh (Pendashteh et al. 2012. Process Safety and Environmental Protection, 90, 45-55) reported the necessary reaction time for processing to be at least 12 hours, with 48 hours being optimal under their laboratory experimental design. Low throughput and reactor time necessary thus far have defeated field application of that approach.

There is a need for improved methods for treating produced water from oil field operation so that processed produced water may be transformed for useful purposes.

SUMMARY

In some embodiments, a method of treating oil and gas produced water may include: receiving produced water from one or more wells; separating an aqueous portion of the produced water from oil and solids included in the produced water in order to provide recovered water; performing anaerobic bio-digestion of organic matter included in the recovered water using a biomass mixture of anaerobic bacteria obtained from a plurality of wells; aerating the recovered water in order to promote metal precipitation; and performing aerobic bio-digestion of organic matter present in the recovered water.

In some embodiments, a method of treating oil and gas produced water may also include transitioning the aeration and aerobic treated water to anoxic equalization allowing for completion of oxidation and further bio-digestion of organic matter providing a treated recovered water product.

In some embodiments, a method of treating oil and gas produced water may include receiving produced water from one or more wells; separating an aqueous portion of the produced water from oil and solids included in the produced water in order to provide recovered water; performing anaerobic bio-digestion of organic matter included in the recovered water using a naturally obtained biomass mixture of anaerobic bacteria obtained from a plurality of wells; aerating the recovered water in order to promote metal precipitation; performing aerobic bio-digestion of organic matter present in the recovered water; filtering insoluble particles from the recovered water using size filtration; further filtering ionic substances from the recovered water using ion capture filtration; and micro-filtering the recovered water using a nominal micro-filter having a filter size equal to or less than one micron or an ultra- or nano-filter; thereby providing a product suitable for oil and gas well fracking or for further processing to meet stream and land application standards.

In some embodiments, a method of treating oil and gas produced water may include providing a first biomass mixture within a bio-digester, the first biomass mixture including biomass stored within the bio-digester following one or more previous treatments of produced water; receiving a new batch of produced water from one or more oil or gas wells; and bio-digesting organic matter included in the new batch of produced water using the first biomass mixture.

In some embodiments, a method of treating oil and gas produced water may include processing the treated recovered water product by size and ion capture filtration and decontamination/pasteurization yielding a filtered essentially microbial free water product.

In some embodiments, a method of treating oil and gas produced water may include treating the filtered essentially microbial free water product by further filtration and/or ion capture producing a product suitable for reverse osmosis treatment.

In some embodiments, a method of treating oil and gas produced water may also include treating the recovered water by reverse osmosis treatment.

DETAILED DESCRIPTION

The following terms as used herein should be understood to have the indicated meanings.

When an item is introduced by "a" or "an," it should be understood to mean one or more of that item.

"Biomass" means living matter including bacteria. Biomass may take various forms, such as a suspension of bacteria in a liquid, bacteria attached to a structure such as a biofilm, and a combination thereof.

"Comprises" means includes but is not limited to.

"Comprising" means including but not limited to.

"Having" means including but not limited to.

"Size filtration" means filtration of insoluble solids based on particle size.

The present disclosure relates to systems, methods, and compositions useful for the treatment of oil and gas produced water that yields products suitable for land or stream applications or other uses. Produced water includes formation water that has been trapped in a geological reservoir with oil and natural gas and collected during oil well processing. The produced water may generally be considered a waste product of production if not further processed for a usable purpose.

Produced water composition can vary greatly based on the associated well or formation. Accordingly, methods for treating produced water may advantageously be configured for accepting a range of various compositional matrices while maintaining effectiveness to yield an end product suitable for its intended purpose.

In some embodiments, methods herein include treatment of produced water that combines anaerobic bio-digestion of produced water with separation of oil, water, and insoluble solids therefrom in order to provide an anaerobically treated water product.

In some embodiments, methods herein may further include processing the anaerobically treated water product by aeration, and aerobic bio-digestion followed by equalization, yielding a treated recovered water product.

In some embodiments, methods herein may further include processing the treated recovered water product by either or both of insoluble solids and ion capture filtration and decontamination/pasteurization processing to provide a filtered substantially microbial free recovered water product suitable for further freshwater processing or oil and gas well fracking water use.

In some embodiments, methods herein may further include processing the filtered substantially microbial free recovered water product by further filtration and/or ion capture producing a product suitable for reverse osmosis (RO) treatment.

In some embodiments, the ordering of the aforementioned process steps can be changed to facilitate variability in oil and gas received produced water to meet one or more sets of desired specifications.

Figure 1:
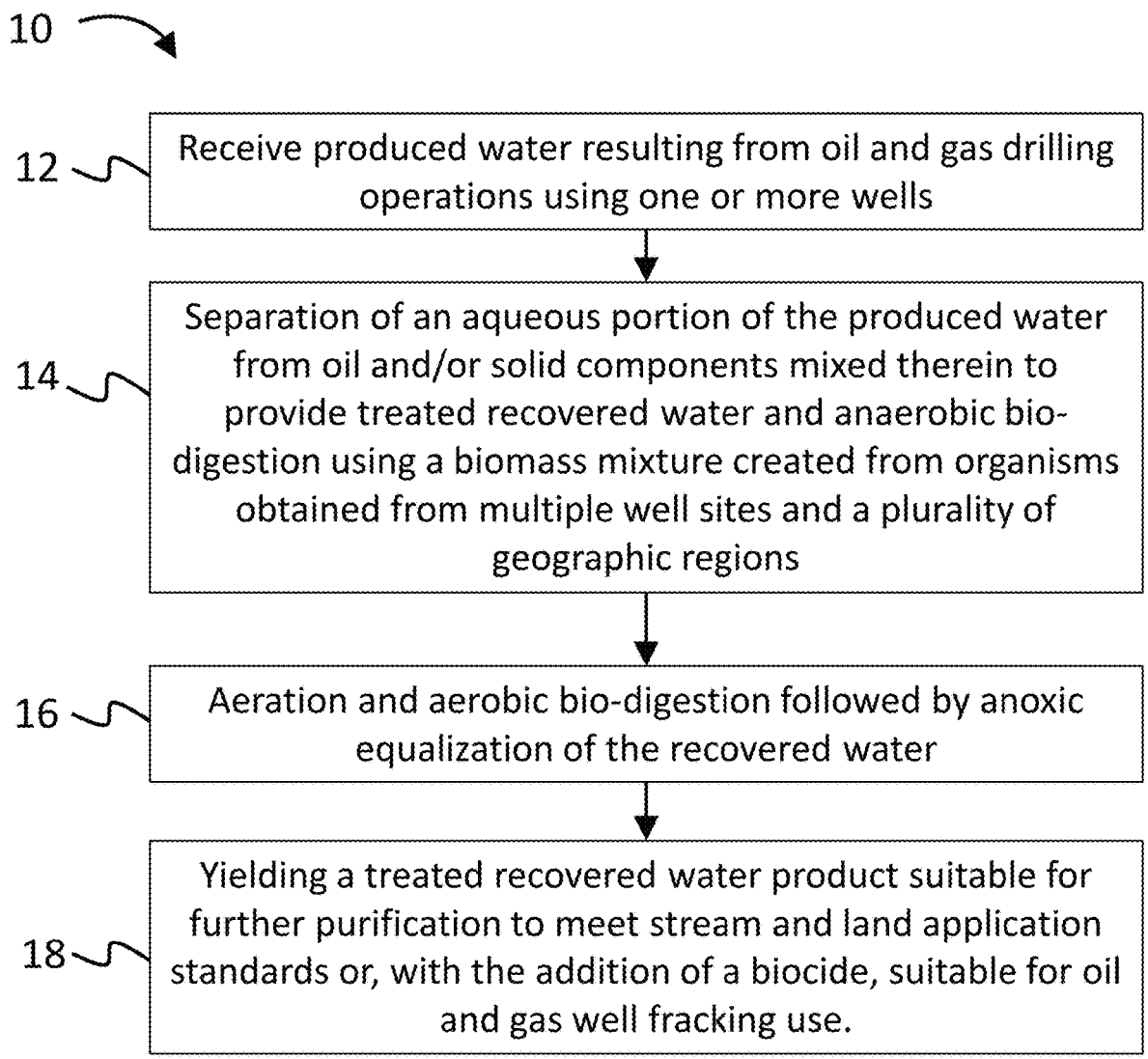
FIG. 1 is a flowchart of a method for treating oil and gas produced water resulting from oil and gas drilling operations in order to provide treated recovered water yielding a product suitable for oil and gas well fracking use with addition of a biocide.

Referring to FIG. 1, in some embodiments, a method 10 may include receiving produced water from one or more oil and gas wells as shown at 12. As shown at 14, the method may include processing oil and gas produced water by separating oil, water and solids and simultaneously or sequentially beginning anaerobic bio-digestion of organic matter that exists as contaminants in the water. Anaerobic bio-digestion may be accomplished using a selected biomass created by mixing organisms obtained from a plurality of well sites and from various formations from the Permian Region of the Southwestern United States that creates a biomass capable of handling diverse compositions of produced water. For example, in some embodiments, the anaerobic biomass may include a plurality of organisms that fall into the following Taxonomic Classes: Bacteroidia, Clostridia, Deltaproteobacter, Epsilonproteobacteria, Gammaproteobacteria, Negativicutes, and Synergistia, which may be obtained from raw materials from multiple well sites and multiple formations from the Permian Region of the Southwestern United States over an extended period of time of about two to three years.

In some embodiments, anaerobic bio-digestion may occur for about 4 to about 24 hours at a pH greater than about 5.5 and a temperature greater than about 27° C. In some embodiments, the preferred time for bio-digestion may range from about 5-9 hours. Of course, other suitable pH, temperature, residence times, organisms, formations, and collection times may be used, depending on the particular mixture involved.

In some embodiments, a temperature greater than about 55° C. may be utilized to achieve thermophilic anaerobic bio-digestion maintaining a pH greater than about 5.5 for some or all of the duration of the bio-digestion process.

In some embodiments, a combination of different types of oil/water/solids separators may be employed in combination with different types of bioreactors, such as a membrane bioreactor that may be utilized for anaerobic bio-digestion. A membrane bioreactor may also serve as a filtration device for insoluble solids removal. In some embodiments, anaerobic biomass separation may be incorporated prior to further processing.

In some embodiments, as shown at 16, separation of oil/water/solids and anaerobic bio-digestion may be followed by aeration and anoxic equalization of the separated and anaerobic treated recovered water product for substantial separation of minerals and metals and aerobic bio-digestion for further organic bio-digestion. In some embodiments, aeration may either be by use of diffused air or aspirated air that achieves a dissolved oxygen level of about 2-8 mg/L or about 4-7 mg/L and a residence time of about 30 minutes to about 24 hours. In some embodiments, the residence time for aeration may range from about 1-12 hours or about 2-4 hours. In some embodiments, aerobic bio-digestion may be accomplished using a biomass created by mixing organisms obtained from a plurality of well sites from various formations from the Permian Region of the Southwestern United States, such as a plurality of wells from one or more of the Midland Basin, Western Delaware Basin, Central Basin, and Marfa Basin, for example. In some embodiments, the aerobic biomass may include a plurality of organisms that fall into the following Taxonomic Classes: Actinobacteria, Alphaproteobacteria, Bacteroidia, Betaproteobacteria, and Gammaproteobacteria, which may be obtained from raw materials from multiple well sites and multiple formations from the Permian Region of the Southwestern United States over an extended period of time of about two to three years. In some embodiments, recovered water may be transitioned from aeration and aerobic bio-digestion to anoxic equalization allowing for completion of oxidation and further bio-digestion of organics for a residence time of about 30 minutes to about 12 hours or about 2-4 hours. Of course, other suitable oxygen levels, residence times, organisms, formations, and collection times may be used, depending on the particular mixture involved.

In some embodiments, a membrane bioreactor may be utilized for aerobic bio-digestion. In some embodiments, aerobic biomass separation may be incorporated prior to further processing. The processes of oil, water, solids separation, anaerobic bio-digestion, aeration, aerobic bio-digestion and anoxic equalization may yield a treated recovered water product suitable for further downstream processing that will meet stream and land application standards.

In some embodiments, see, e.g., FIG. 1, Step 18, a suitable biocide such as a non-oxidizing antibacterial/antifungal or an oxidizing antibacterial/antifungal may be added to the treated recovered water product for use in oil and gas well fracking operations.

Figure 2:
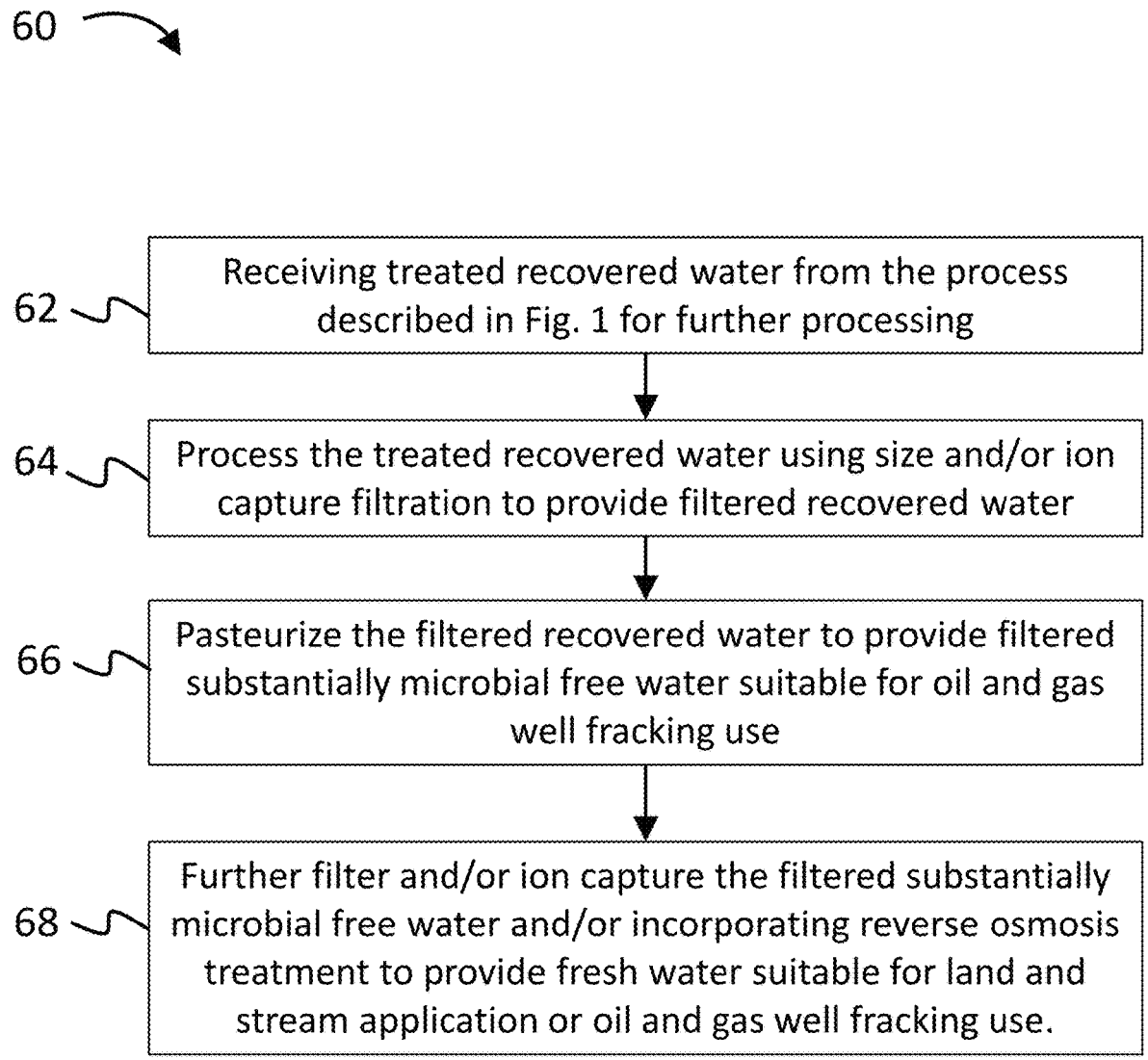
FIG. 2 is a flowchart of a method for treating the treated recovered water to yield fresh water suitable for land and stream application or oil and gas well fracking use.

Referring to FIG. 2, a method 60 of processing produced water may include receiving treated recovered water from the process described in FIG. 1 for further processing as indicated at 62. In some embodiments, see, e.g., FIG. 2, Step 64, a first filtration of treated recovered water may use a filter removing insoluble particles ranging in size from about 1-75 microns, for example, or about 1-20 microns, or about 1-10 microns. Of course, other suitable filter sizes may be used. In some embodiments, the physical separation can be achieved by use of a membrane or media type filter. In some embodiments, see, e.g., FIG. 2, step 64, ion capture may be incorporated as part of filtration for further removal of cationic and certain anionic substances, such as sodium and chlorides, for example. In some embodiments, a dedicated ion capture of anionic materials can be incorporated during the filtration process. For example, anionic charged glass media of different particle sizes can be used for capture of cationic materials. To achieve maximum capture, anionic glass charged media of about 0.25 mm particle size may be used and may include about 60-90% of media incorporated into a filter housing.

In some embodiments, see, e.g., FIG. 2, Step 66, filtered recovered water may be transitioned to a pasteurizer that achieves a temperature of about 71° C. to about 94° C., for example, and further cooled to a temperature less than about 35° C. yielding a filtered substantially microbial free water product for freshwater processing or for oil and gas fracking water use. In some embodiments, a nominal micro-filter of equal to or less than 0.45 microns, for example, and/or an ultra- or nano-filter can be used to replace the pasteurizer to yield the filtered substantially microbial free water product suitable for oil and gas well fracking use.

In some embodiments, see, e.g., FIG. 2, Step 68, filtered substantially microbial free water may be further filtered producing a product suitable for reverse osmosis (RO) treatment. In some embodiments, filtration can be accomplished by using ion capture and/or using micro-filtration, ultra-filtration and/or nano-filtration. Filtration may remove insoluble particles ranging in size greater than 5 microns, for example, and in some embodiments may remove insoluble particles greater than 1 micron. In some embodiments, an ultra-filter or nano-filter can be used achieving filtration of 0.05 microns or 100,000 Daltons or below. In some embodiments, pre-reverse osmosis filtered water is transitioned to RO treatment. Select saltwater membranes may be utilized for RO treatment that will handle dissolved solids content levels as great as 50,000 ppm, for example.

In some embodiments, ordering of process steps in the methods 10, 60 may be changed to accommodate variability in oil and gas received produced water. For example, where produced water contains heavy metals that are deleterious to bio-digestion of organic compounds, the heavy metals may be removed by first separation of oil/water and solids and then separation of metals by controlled oxidation to enhance metal precipitation using aeration. In some embodiments, ion capture separation inclusive of electrodialysis or ion exchange resins prior to anaerobic bio-digestion may also be utilized.

In some embodiments herein, bio-digestion may involve mixing produced water, which may itself include microorganisms, with a selected biomass mixture of microorganisms collected over time from a plurality of different oil and/or gas wells. In some embodiments, the plurality of wells may be found in different areas of a particular oil and/or gas producing geographic region and/or basins. Still in other embodiments, the plurality of wells may be based on one or more characteristics of either or both of a type of geologic formation into which wells may be drilled, characteristics of produced water derived therefrom, or both. For example, geologic formations and produced water may be characterized based on levels of pH, levels of salinity, levels of heavy metals, in situ well or formation temperature, or other parameters and any combinations thereof. The plurality of wells may then be selected so that collected biomass is naturally designed to operate over a selected range of any of the aforementioned well or produced water characteristics or combinations thereof. A geographic region as used herein may refer to an extended area of land or sea known to include oil or gas based on common geologic history. For example, a geographic region may contain several basins and/or formations known to be oil or gas rich or part of an oil or gas rich basin or formation.

In some embodiments, at least a portion of the stored biomass mixture may be transferred from a biodigester to one or more separate biodigesters to seed other digesters for expansion of produced water bio-digestion.

The systems and methods herein may further be understood in terms of the following Examples.

Example 1

Figure 3:
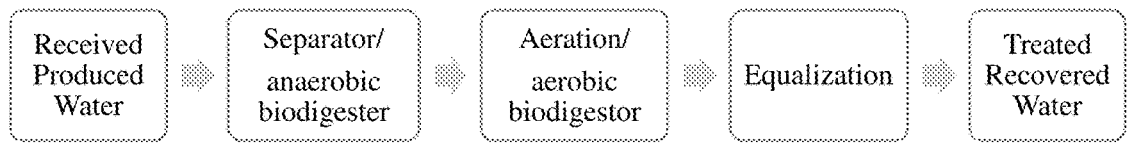
FIG. 3 is a flowchart of a method for processing produced water in order to provide treated recovered water.

FIG. 3 shows a schematic representation of the process flow used in this Example 1. Produced water was received and was processed through a combination oil/water/solids separator and biodigester in a single unit as described in U.S. patent application Ser. No. 16/109,563 filed Aug. 22, 2018, which is commonly owned by Applicant and incorporated herein by reference. The apparatus efficiently separates oil and solids from the produced water and allows anaerobic bio-digestion to occur within the separator thereby reducing organic contaminants present in the water. Bio-digestion was accomplished with a mixture of anaerobic bacteria. The anaerobic biomass included a plurality of organisms that fall into the following Taxonomic Classes: Bacteroidia, Clostridia, Deltaproteobacter, Epsilonproteobacteria, Gammaproteobacteria, Negativicutes, and Synergistia obtained from raw materials from multiple well sites, and multiple formations from the Permian Region of the Southwestern United States over an extended period of time of about two to three years. The biomass was maintained in the biodigester and continual modification was accomplished by addition of received oil and gas waste products raw materials from the aforementioned multiple sites and formations allowing for a symbiotic ecosystem to occur. Following separation and anaerobic treatment, the recovered separated processed water proceeded to an aeration vessel with diffused aeration for two hours oxidizing metals and minerals in the water. Diffused aeration also allowed for further aerobic bio-digestion to occur. The aerobic biomass included a plurality of organisms that fall into the following Taxonomic Classes: Actinobacteria, Alphaproteobacteria, Bacteroidia, Betaproteobacteria, and Gammaproteobacteria obtained from raw materials from multiple well sites, and multiple formations from the Permian Region of the Southwestern United States over an extended period of time of about two to three years. Once aerated, the water was allowed to equalize in a vessel for two additional hours where upon leaving, treated recovered water was achieved.

Data in Table 1 are certified commercial lab results for the received produced water and treated recovered water following treatment. A 97.6% decrease in total suspended solids was observed and over 70% reduction in all metals and minerals was determined. Reductions of 86.1% and 83.5% were recorded for chloride and arsenic, respectively. These reductions are indicative that a substantial amount of biological bio-digestion was occurring throughout treatment. The aeration and equalization processes additionally removed large amounts of metal and mineral contaminants.

TABLE 1

| Parameter | Received Produced Water | Treated Recovered Water | Percent Change |
|---|---|---|---|
| Arsenic (mg/L) | 0.11 | 0.0182 | 83.5 |
| Barium (mg/L) | 4.41 | 0.451 | 89.8 |
| Cadmium (mg/L) | <0.004 | <0.002 | — |
| Calcium (mg/L) | 2850 | 387 | 86.4 |
| Chromium (mg/L) | 0.00896 | <0.004 | — |
| Lead (mg/L) | <0.02 | <0.01 | — |
| Magnesium (mg/L) | 434 | 98.4 | 77.3 |
| Potassium (mg/L) | 557 | 87.8 | 84.2 |
| Sodium (mg/L) | 46800 | 6310 | 86.5 |
| Selenium (mg/L) | 0.633 | 0.0173 | 97.2 |
| Silver (mg/L) | <0.004 | <0.002 | — |
| Chloride (mg/L) | 76400 | 10600 | 86.1 |
| Fluoride (mg/L) | 47.5 | <10.0 | — |
| Sulfate | 305 | 571 | 87.2 increase |
| Mercury (mg/L) | <0.001 | <0.0002 | — |
| Nitrate as N (mg/L) | <2.00 | <2.00 | — |
| Nitrite as N (mg/L) | <2.00 | <2.00 | — |
| Toluene | 1.26 | 0.554 | 56.0 |
| Total Suspended Solids (mg/L) | 2490 | 60.5 | 97.6 |
| Biological Oxygen Demand (BOD) (mg/L) | 467 | 15.2 | 96.7 |
| Hydrogen Sulfide (mg/L) | <5.00 | <5.00 | — |
| Specific Conductance (umhos/cm) | 174000 | 32000 | 81.6 |

The resulting product from the separation, bio-digestion, aeration and equalization processes described provide a suitable product for further processing to achieve objectives for a usable oil and gas well fracking product or freshwater product for land irrigation or stream application. In some embodiments, with the addition of an appropriate biocide to the treated recovered water product, it could in certain circumstances be used in oil and gas well fracking.

Example 2

Treated recovered water achieved through the processing described in Example 1 was further treated by microfiltration. A 20-micron filtration followed by 5-micron filtration was used to achieve the results in Table 2.

TABLE 2

| Parameter | Filtered Water (mg/L) |
|---|---|
| Arsenic (mg/L) | nd |
| Barium (mg/L) | 0.444 |
| Cadmium (mg/L) | nd |
| Calcium (mg/L) | 589 |
| Chromium (mg/L) | nd |
| Iron (mg/L) | — |
| Lead (mg/L) | nd |
| Magnesium (mg/L) | 120 |
| Manganese (mg/L) | — |
| Potassium (mg/L) | 97.1 |
| Sodium (mg/L) | 6960 |
| Selenium (mg/L) | nd |
| Silver (mg/L) | nd |
| Chloride (mg/L) | 11000 |
| Fluoride (mg/L) | 5.76 |
| Sulfate | 766 |
| Mercury (mg/L) | nd |
| Nitrate as N (mg/L) | nd |
| Nitrite as N (mg/L) | nd |
| Total Suspended Solids (mg/L) | 10.8 |
| pH | 7.88 |
| Total Alkalinity | 111 |
| Cation-Anion Balance (%) | 2.4 |

The resulting product obtained following the described filtration would be suitable for use in oil and gas well fracking operations with an incorporated addition of a biocide.

Example 3

Figure 4:
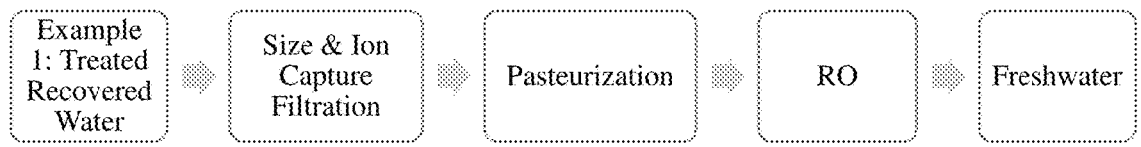
FIG. 4 is a flowchart of a method for processing and purification of treated recovered water to produce freshwater.

FIG. 4 is a schematic diagram of the process flow for this Example 3. Treated recovered water obtained from the process demonstrated in Example 1 was further processed by using a combination AFM™ ion capture filtration media manufactured by Dryden Aqua Ltd (Edinburgh, United Kingdom) capable of removal of insoluble particles greater than 1 micron and capture of cationic ions (see British Patent Application Publication No. GB2413124A, which is incorporated herein by reference). A combination of media size of about 2-6 mm, about 0.4-1 mm, and about 0.25-0.5 mm was used at 17.5%, 17.5%, and 65%, respectively, by volume. Total dissolved solids and total suspended solids were reduced as a result of filtration as shown in the Post Filtration data column of Table 3 below. A reduction of 82.8% and 84.8% were achieved for chloride and sodium, respectively, by use of the aforementioned ion capture filtration media. A significant reduction in calcium (63.6%), magnesium (71.3%) and potassium (72%) were observed as well as an 83.7% reduction in sulfates, yielding a product suitable for reverse osmosis treatment. Following filtration, the water was further treated using pasteurization at 170° C. for bio-decontamination followed by use of a reverse osmosis (RO) system for further removal of impurities.

Water quality data for the post RO treated water in Example 3 is shown in Table 3. A 16.2 mg/L chloride level and 14.4 mg/L sodium level was achieved as well as reduction of several parameters such as Bromide, Magnesium, Sulfate, Nitrite, Total Petroleum Hydrocarbons, and Alkalinity falling below detection limits of the assays used.

TABLE 3

| Parameter | Post Filtration: Size and Ion Capture and Essentially Microbial Free | Percent Change from Table 1 Data | Post RO | National Recommended Water Quality Criteria (Freshwater) |
|---|---|---|---|---|
| Bromide (mg/L) | 9.07 | — | Below Detection Limits | — |
| Calcium (mg/L) | 141 | 63.6 | 0.349 | — |
| Magnesium (mg/L) | 28.2 | 71.3 | Below Detection Limits | — |
| Potassium (mg/L) | 24.6 | 72.0 | 0.541 | — |
| Sodium (mg/L) | 959 | 84.8 | 14.4 | — |
| Chloride (mg/L) | 1820 | 82.8 | 16.2 | 230 |
| Sulfate (mg/L) | 93.2 | 83.7 | Below Detection Limits | — |
| Nitrate as N (mg/L) | 1.81 | — | 0.174 | — |
| Nitrite as N (mg/L) | 0.687 | — | Below Detection Limits | — |
| Total Dissolved Solids (mg/L) | 3620 | — | 39.5 | — |
| Total Petroleum Hydrocarbons | Below Detection Limits | — | Below Detection Limits | — |
| pH | 7.94 | — | 7.21 | 6.5-9 |
| Alkalinity, Carbonate (CaCO$_3$) (mg/L) | Below Detection Limits | — | Below Detection Limits | 200 |

The results indicated that all finished RO water parameters were well below stream water standards established by the United States Environmental Protection Agency (EPA) (see National Recommended Water Quality Criteria-Aquatic Life Criteria Table available at https://www.epa.gov/wqc/national-recommended-water-quality-criteria-aquatic-life-criteria-table, which is attached hereto as an Appendix and incorporated herein by reference) (referred to herein as the "EPA Freshwater Standards"). A significant reduction in sodium, calcium, magnesium and potassium (cations) as well as chlorides and sulfates (anions) post ion capture filtration was demonstrated as compared to values shown in Table 1, Treated Recovered Water. The method of treatment demonstrated the capability of providing freshwater suitable for land application or irrigation, helping restore diminishing levels of ground water. Freshwater generated by the treatment process described herein would additionally provide water suitable for release to reservoirs, streams and rivers for potential further processing to meet standards for potable water. The freshwater generated could also be used for oil and gas well fracking if so desired.

Example 4

Figure 5:
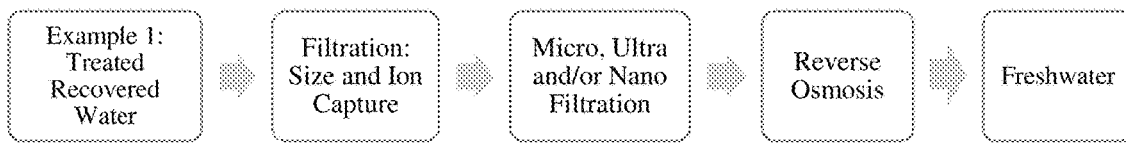
FIG. 5 is a flowchart of another method for processing treated recovered water to produce freshwater.

Treated recovered water obtained from processing described in Example 1 can be further processed to meet land and stream application standards by micro-filtration, ultra-filtration and/or nano-filtration for removal of bacteria and dissolved solids prior to RO finishing. The treated recovered water can also be treated by heating for removal of alcohols and low molecular weight hydrocarbons if required. FIG. 5 shows a process flow suitable for meeting the EPA Freshwater Standards. In some embodiments, such a process path would allow removal of a bio-decontamination/pasteurization step in the overall process.

In some embodiments, ordering of process steps can be changed to facilitate variability in oil and gas received produced water. Where produced water contains heavy metals that are deleterious to bio-digestion of organic compounds, the heavy metals may be removed by first separation of oil/water and solids and then separation of metals by controlled oxidation using aeration. Ion capture separation inclusive of electrodialysis or ion exchange resins prior to anaerobic bio-digestion could also be utilized. Moreover, while many examples in this document refer to systems and methods for water treatment, it is understood that those systems and methods are described in an exemplary manner only and that other systems and methods may be used. For example, any feature in one embodiment may be included in any other embodiment. Additionally, other treatment steps and devices may be used, depending on the particular needs. Although the foregoing specific details describe certain embodiments, persons of ordinary skill in the art will recognize that various changes may be made in the details of these embodiments without departing from the spirit and scope of this invention as defined in the appended claims and considering the doctrine of equivalents. Therefore, it should be understood that this invention is not limited to the specific details shown and described herein.

What is claimed is:

1. A method of treating oil and gas produced water, the method comprising:
   receiving produced water from one or more wells;
   separating an aqueous portion of the produced water from oil and solids included in the produced water in order to provide recovered water;
   performing anaerobic bio-digestion of organic matter included in the recovered water using a biomass mixture of anaerobic bacteria obtained from a plurality of wells;
   wherein said anaerobic bacteria include a first plurality of organisms that fall into the taxonomic classes of Bacteroidia, Clostridia, Deltaproteobacter, Epsilonproteobacteria, Gammaproteobacteria, Negativicutes, and Synergistia;

aerating the recovered water in order to promote metal precipitation; and performing aerobic bio-digestion of organic matter present in the recovered water using aerobic bacteria including a second plurality of organisms that fall into the taxonomic classes of Actinobacteria, Alphaproteobacteria, Bacteroidia, Betaproteobacteria, and Gammaproteobacteria.

2. The method of claim 1 wherein said anaerobic and aerobic bacteria form a symbiotic ecosystem.

3. The method of claim 2 wherein said biomass mixture is obtained from multiple formations over an extended period of time of about two to three years.

4. The method of claim 1 wherein said biomass mixture of anaerobic and aerobic bacteria comprises biomass collected from a plurality of wells and formations of the Permian Region of the Southwestern United States.

5. The method of claim 1 wherein said biomass mixture of anaerobic and aerobic bacteria comprises biomass collected from a plurality of wells from different geographic regions.

6. The method of claim 1 further comprising separation of solids from said produced water using a membrane bioreactor.

7. The method of claim 1 wherein said aerobic bio-digestion is executed using a membrane bioreactor.

8. The method of claim 1 wherein the anaerobic bio-digestion of organic matter includes maintaining a pH greater than about 5.5 and a temperature greater than about 27° C.

9. The method of claim 1 wherein the anaerobic bio-digestion of organic matter is executed for a duration of about 4 to about 24 hours.

10. The method of claim 1 wherein the anaerobic bio-digestion of organic matter includes thermophilic anaerobic bio-digestion.

11. The method of claim 1 further comprising aspirated aeration of the recovered water.

12. The method of claim 1 further comprising diffused aeration of the recovered water.

13. The method of claim 1 wherein said aerating the recovered water is performed at a dissolved oxygen level of about 2 mg/L to about 8 mg/L and a residence time of about 30 minutes to about 24 hours.

14. The method of claim 1 further comprising anoxic equalization of the recovered water and a residence time of about 30 minutes to about 12 hours.

15. The method of claim 1 wherein an order of said method steps is tailored to accommodate variability of the received produced water.

16. The method of claim 1 further comprising addition of a suitable biocide to the recovered water thereby providing a product for use in oil and gas well fracking.

17. The method of claim 1 further comprising:
size filtration of insoluble particles from the recovered water; and
further filtration of the recovered water by ion capture filtration;
thereby providing a product suitable for oil and gas well fracking or for further processing to meet stream and land application standards.

18. A method of treating oil and gas produced water, the method comprising:
receiving produced water from one or more wells;
separating an aqueous portion of the produced water from oil and solids included in the produced water in order to provide recovered water;
performing anaerobic bio-digestion of organic matter included in the recovered water using a naturally obtained biomass mixture of anaerobic bacteria obtained from a plurality of wells;
wherein said anaerobic bacteria include a first plurality of organisms that fall into the taxonomic classes of Bacteroidia, Clostridia, Deltaproteobacter, Epsilonproteobacteria, Gammaproteobacteria, Negativicutes, and Synergistia;
aerating the recovered water in order to promote metal precipitation;
performing aerobic bio-digestion of organic matter present in the recovered water using aerobic bacteria including a second plurality of organisms that fall into the taxonomic classes of Actinobacteria, Alphaproteobacteria, Bacteroidia, Betaproteobacteria, and Gammaproteobacteria;
filtering insoluble particles from the recovered water using size filtration;
further filtering ionic substances from the recovered water using ion capture filtration; and
micro-filtering the recovered water using a nominal micro-filter having a filter size equal to or less than one micron or an ultra- or nano-filter;
thereby providing a product suitable for oil and gas well fracking or for further processing to meet stream and land application standards.

19. The method of claim 18 further comprising:
anoxic equalization of the recovered water;
pasteurizing the recovered water; and
reverse osmosis treatment of the recovered water;
wherein said receiving, said separating, said performing anaerobic bio-digestion, said aerating, said performing aerobic bio-digestion, said filtering, said further filtering, said micro-filtering, said anoxic equalization, said pasteurizing, and said reverse osmosis are ordered to accommodate variability in said produced water.

20. A method of treating oil and gas produced water, the method comprising:
providing a first biomass mixture within a bio-digester, the first biomass mixture comprising a symbiotic biomass collected from a plurality of wells and a plurality of formations and stored within the bio-digester following one or more previous treatments of produced water in the bio-digester;
receiving a new batch of produced water in the bio-digester from one or more oil or gas wells; and
bio-digesting organic matter included in the new batch of produced water in the bio-digester using the first biomass mixture.

* * * * *